US008752249B1

(12) United States Patent
Tsai et al.

(10) Patent No.: US 8,752,249 B1
(45) Date of Patent: Jun. 17, 2014

(54) PIVOTAL SHAFT DEVICE

(71) Applicant: Jarllytec Co., Ltd., New Taipei (TW)

(72) Inventors: Shun-Liang Tsai, New Taipei (TW); Sheng-Hung Chen, New Taipei (TW)

(73) Assignee: Jarllytec Co., Ltd., New Taipei (TW)

( * ) Notice: Subject to any disclaimer, the term of this patent is extended or adjusted under 35 U.S.C. 154(b) by 0 days.

(21) Appl. No.: 13/757,367

(22) Filed: Feb. 1, 2013

(51) Int. Cl.
*E05D 11/00* (2006.01)
*G06F 1/16* (2006.01)

(52) U.S. Cl.
USPC ........................................ 16/357; 361/679.27

(58) Field of Classification Search
USPC ........... 16/366, 368, 357, 360, 361, 320, 239, 16/241, 246; 248/206.5, 683; 455/575.3; 361/679.27; 379/433.11, 433.13
See application file for complete search history.

(56) References Cited

U.S. PATENT DOCUMENTS 7,915,986 B2 * 3/2011 Lu ................................. 335/285
8,060,165 B2 * 11/2011 Kim et al. .................. 455/575.4
8,089,758 B2 * 1/2012 Zhu et al. ................. 361/679.58
8,320,123 B2 * 11/2012 Chen ........................ 361/679.59
8,477,486 B2 * 7/2013 Yang et al. ............... 361/679.27
8,493,725 B2 * 7/2013 Wu et al. .................. 361/679.27
8,520,378 B2 * 8/2013 Kim et al. ................ 361/679.27
2010/0133398 A1 * 6/2010 Chiu et al. ................. 248/206.5
2013/0058027 A1 * 3/2013 Chen et al. ............... 361/679.27
2013/0175264 A1 * 7/2013 Lin ............................. 220/4.22
2013/0201621 A1 * 8/2013 Song et al. ............... 361/679.27

* cited by examiner

*Primary Examiner* — Victor Batson
*Assistant Examiner* — Jason W San
(74) *Attorney, Agent, or Firm* — Guice Patents PLLC

(57) ABSTRACT

The present invention relates to a pivotal shaft device comprising: a pivot unit, a base and two connection units. The base and the pivot unit are located in parallel, two distal ends of the base are respectively formed with at least a groove, a magnetic unit is installed at an inner side of each of the grooves, an attachment area is formed on a surface of the base defined between the grooves; the two connection units are respectively connected with two distal ends of the pivot unit, each of the connection units is respectively formed with a protrusion, the protrusion is slidingly disposed in the groove of the base and magnetically attracted and positioned by the magnetic unit.

11 Claims, 7 Drawing Sheets

PIVOTAL SHAFT DEVICE

BACKGROUND OF THE INVENTION

1. Field of the Invention

The present invention relates to a pivotal shaft device, especially to a pivotal shaft device assembled on a protection cover (or protection component), the protection cover (or protection component) is used in an electronic device such as a tablet compute or a communication products for providing a protection effect.

2. Description of Related Art

The tablet computer is an electronic device which is easy to be carried around and simple in operation, the adopted input method is to utilize a virtual keyboard or hand writing identification system installed on a touch screen, thereby saving the installation of a solid keyboard and mouse. For protecting the touch screen of the tablet computer, skilled people in the art have developed several structures for protection cover, the protection covers are usually installed with a foldable plate member and a pivotal shaft device, the mentioned conventional pivotal shaft device mainly includes two connection pieces and two pivotal shafts, the two pivotal shafts are located in parallel with each other and respectively pivoted between the two connection pieces, wherein one of the pivotal shafts is directly or indirectly combined at one side of the tablet computer, the other pivotal shaft is pivoted at one side of the foldable plate member; so when not being used, the foldable plate member is covered on the touch screen of the tablet computer thereby providing the protection effect; when being used, the foldable plate member is lifted and folded thereby forming a support allowing the tablet computer to lean against.

In the pivotal shaft combined with tablet computer, an opened slot is radially formed on the pivotal shaft, a concave magnetic shunt is installed in the opened slot, two sides of the magnetic shunt are respectively installed with an insertion plug thereby fastening the magnetic shunt in the opened slot, and plural first magnetic units are installed in the magnetic shunt, and a protection label is provided at the opening of the opened slot thereby allowing the magnetic shunt and the plural first magnetic units to be sealed in the opened slot, one side of the tablet computer is correspondingly installed with plural second magnetic units for achieving mutual magnetic attraction, such that the pivotal shaft can be detachably combined with the tablet computer; the "Accessory device and pivoting magnetic assembly" disclosed in the U.S. patent application Ser. Nos. 29/375,197, 61/384,179 and 12/971,62 are examples of the conventional pivotal shaft device.

However, the two pivotal shafts are fixed at certain locations between the two connection pieces, so the two pivotal shafts can only individually rotate, and a relative sliding movement (i.e. one pivotal shaft is moved for being away from or close to the other pivotal shaft) is unable to be generated between the two pivotal shafts, so when the protection cover is desired to be used in a tablet computer having a greater thickness, the foldable plate member may not be able to completely cover the touch screen; moreover, the foldable plate member is a soft leather cover, the pivotal connecting location of the soft leather cover and the other pivotal shaft is restrained by the other pivotal shaft thereby not being able to adjust the location along with the applied pulling force, so the mentioned pivotal connecting location is more easily to be frequently pulled or overly pulled, the pivotal connecting location of the soft leather cover is therefore fragile and easy to be broken, the mentioned disadvantage is the issue that the present invention aims to solve.

For solving the mentioned disadvantage, the present invention provides a pivotal shaft device having effects of sliding movement and recovering positioning thereby improving the capability of fitting with a wider range of thickness and increasing the operation convenience.

SUMMARY OF THE INVENTION

One primary objective of the present invention is to provide a pivotal shaft device having effects of sliding movement and recovering positioning, a relative sliding movement is enabled to be generated between a base and a pivot unit thereby allowing the base to rotate during the relative sliding movement; so when a protection cover formed through the disclosed structure being adopted in a tablet computer, not only the original rotating effect is provided, but also enables the foldable plate member to be pulled and adjusted, the present invention can improve the capability of fitting with a wider range of thickness and to protect the pivoting location of a soft leather cover, thereby increasing the operation convenience.

For achieving the above-mentioned objective, the present invention provides two technical solutions for the pivotal shaft device, according to the first technical solution, the pivotal shaft device comprises: a pivot unit; a base located in parallel with the pivot unit, two distal ends of the base are respectively formed with at least a groove, a magnetic unit is installed at an inner side of each of the grooves, an attachment area is formed on a surface of the base defined between the grooves; and two connection units respectively connected with two distal ends of the pivot unit, each of the connection units is respectively formed with a protrusion, the protrusion is slidingly disposed in the groove of the base and magnetically attracted and positioned by the magnetic unit; thus a relative sliding movement is enabled to be generated between the base and the pivot unit thereby allowing the base to rotate during the relative sliding movement.

According to the second technical solution, the pivotal shaft device comprises: a pivot unit; a base located in parallel with the pivot unit, two distal ends of the base are respectively formed with a protrusion, an attachment area is formed on a surface defined between the protrusions; and two connection units respectively connected with two distal ends of the pivot unit, each of the connection units is respectively formed with at least a groove, an inner side of the groove is installed with a magnetic unit, each of the protrusions of the base is slidingly disposed in the groove of each of the connection units and magnetically attracted and positioned by the magnetic unit; thus a relative sliding movement is enabled to be generated between the base and the pivot unit thereby allowing the base to rotate during the relative sliding movement.

With the disclosed technical solutions, the pivotal shaft device provided by the present invention has following advantages comparing to a conventional pivotal shaft device:

1. The base and the pivot unit of the present invention are able to individually rotate and also capable of generating a relative siding movement, thereby allowing the base to rotate during the relative sliding movement, so the adjustment is easy to be carried out.
2. According to the present invention, a brake unit is installed in the groove, a magnetic unit is adopted in the brake unit for recovering and positioning after the sliding movement, and a brake effect is also provided, so the operation convenience is enhanced.
3. According to the present invention, the grooves are respectively formed at the two distal ends of the connection unit, and the protrusions are respectively formed at the two distal ends of the base, thereby increasing the application of the present invention in a protection cover, and preventing the effect of sliding movement and recovering positioning provided by the present invention from being impeded.

4. According to the present invention, with the technical feature of forming recessed slot and positioning shallow groove, the base is enabled to be integrally formed, and a magnetic shunt and insertion plugs used in a conventional pivotal shaft device are saved, so the material required for manufacturing is reduced, thereby allowing the individual production to be processed and facilitating the magnetic units to be assembled in the two distal ends of the base.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 5:
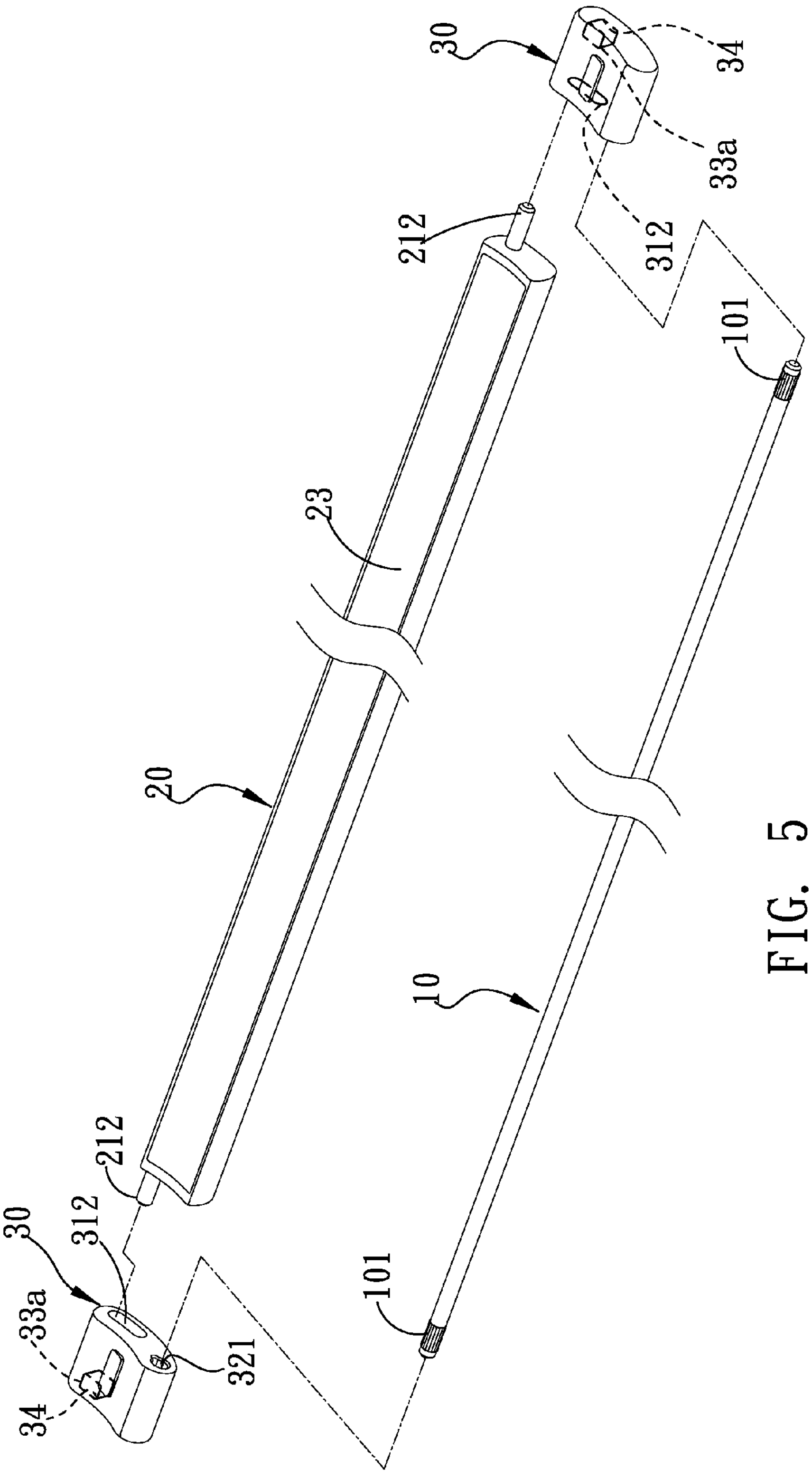
FIG. 5 is a perspective exploded view illustrating the pivotal shaft device according to a second embodiment of the present invention.

The present invention provides a pivotal shaft device, which comprises a pivot unit, a base and two connection units, with the corresponding grooves and protrusions being respectively installed on the base and the connection units which are mutually pivoted, and with a brake unit adopting a magnetic unit for operation, two embodiments are provided by the present invention for a clear disclosure, FIG. 1 to FIG. 4 disclose a first embodiment of the present invention, in which grooves and protrusions are respectively formed on the base and the connection units, and a magnetic unit is installed in the groove, and FIG. 5 discloses a second embodiment of the present invention which is an alternative of the first embodiment, and characterized in that the protrusions and the grooves are respectively formed on the base and the connection units, and the magnetic unit is installed in the groove.

As shown from FIG. 1 to FIG. 4, the pivotal shaft device provided by the present invention comprises a pivot unit 10, a base 20 and two connection units 30. The base 20 and the pivot unit 10 are located in parallel, two distal ends of the base 20 are respectively formed with at least a groove 211, one side of each of the grooves 211 is installed with a magnetic unit 22*a*, e.g. a magnet. An attachment area 23 is formed a surface of the base 20 defined between the two grooves 211. The two connection units 30 are respectively connected with the two distal ends of the pivot unit 10, each of the connection units 30 is formed with a protrusion 311 which is capable of being slidingly disposed in the groove 211 of the base 20 and being magnetically attracted and positioned by the magnetic unit 22*a*, thereby allowing the pivot unit 10 and the base 20 to be able to rotate individually and rotate relatively, and an effect of relative sliding movement is generated between the pivot unit 10 and the base 20, thereby the base 20 being enabled to rotate while sliding and moving, and to be magnetically attracted and positioned by the magnetic unit 22*a* for being provided with a braking effect, so an adjustment operation is facilitated and the operating convenience is enhanced.

Figure 1:
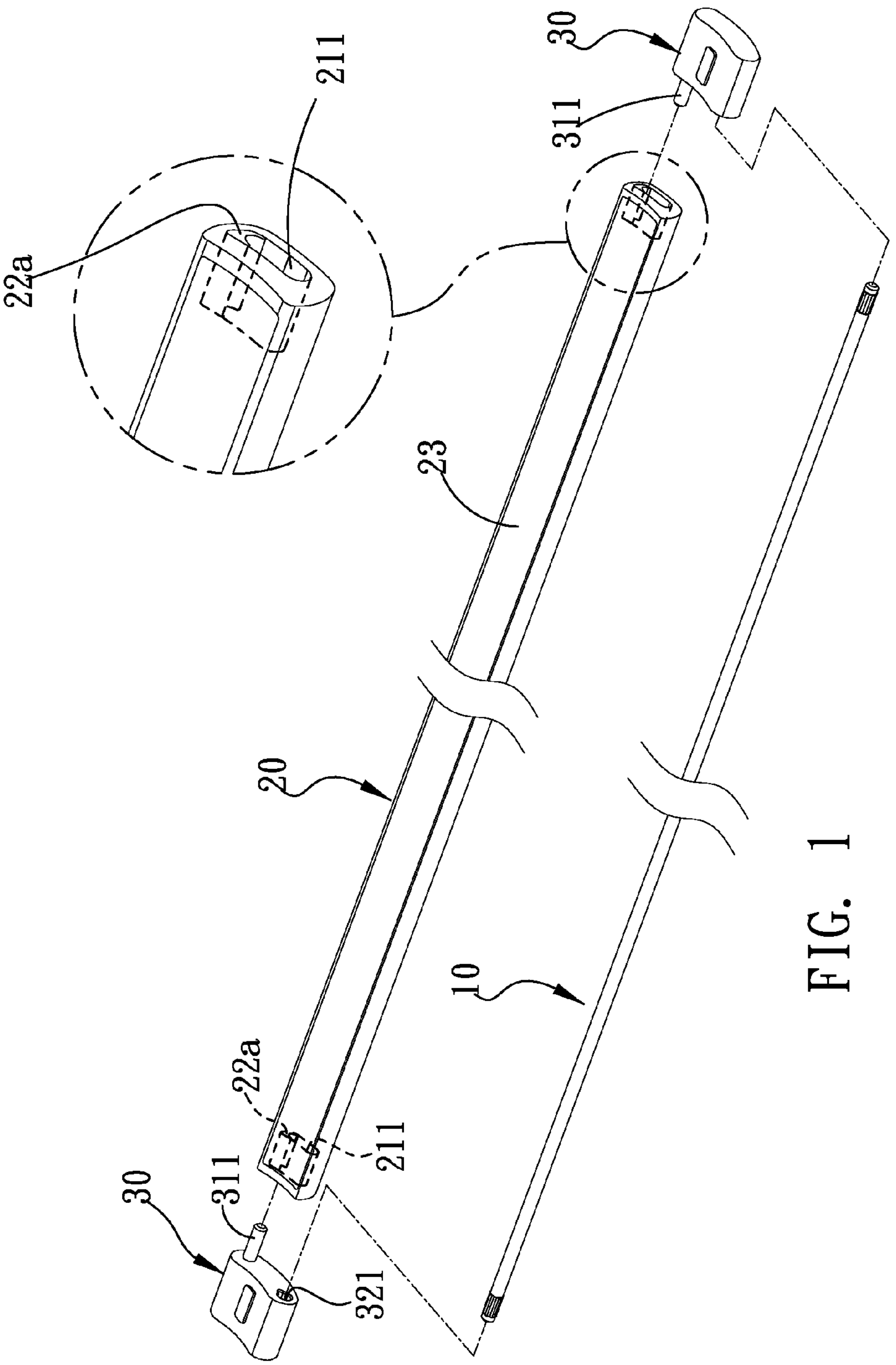
FIG. 1 is a perspective exploded view illustrating the pivotal shaft device according to a first embodiment of the present invention.
Figure 2:
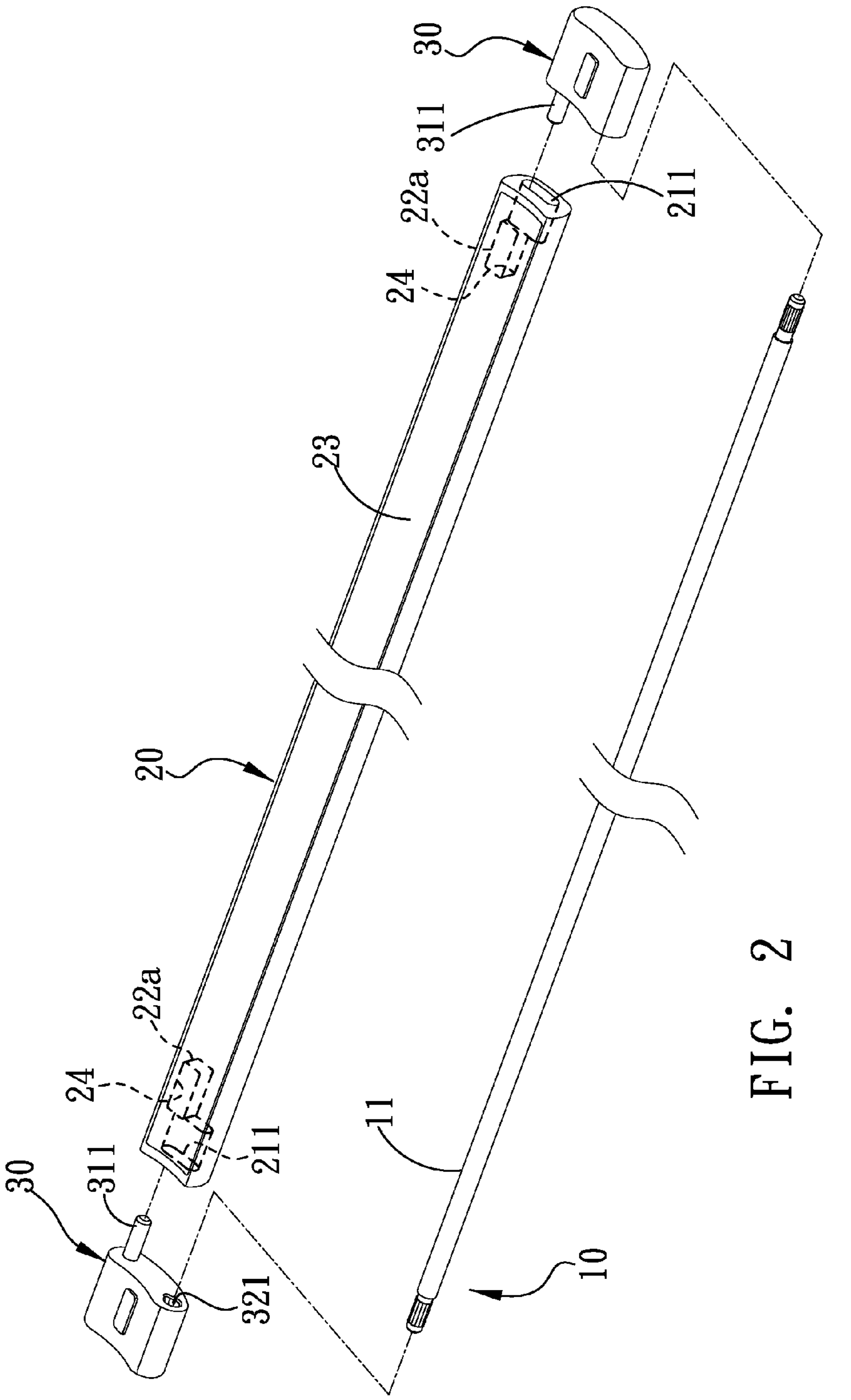
FIG. 2 is a schematic view illustrating a first positioning slot being formed in the groove shown in FIG. 1 and the pivot unit being further sleeved with a pipe member according to the first embodiment of the present invention.
Figure 2A:
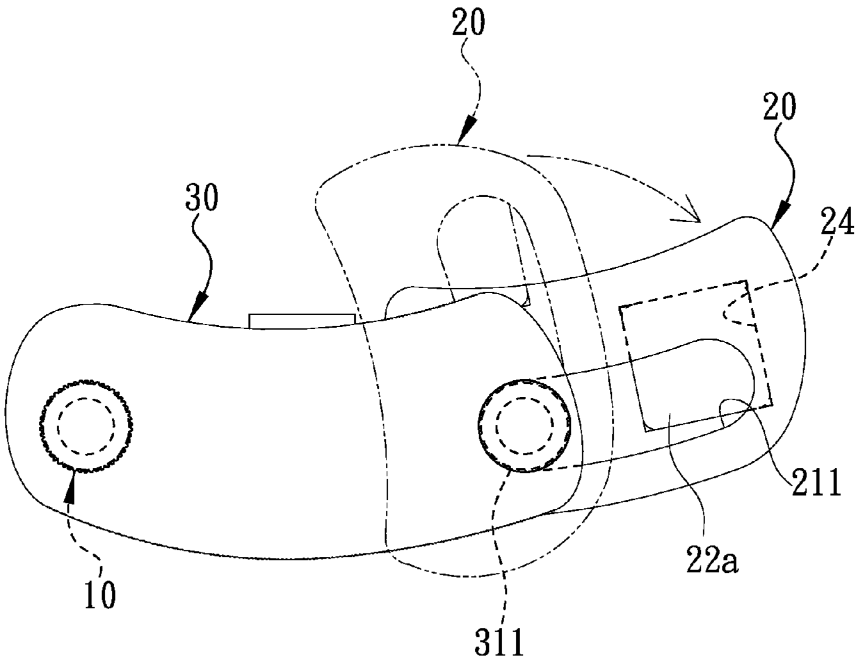
FIG. 2*a* is a schematic view illustrating the base being pulled after the pivotal shaft device shown in FIG. 2 being assembled according to the first embodiment of the present invention.
Figure 2B:
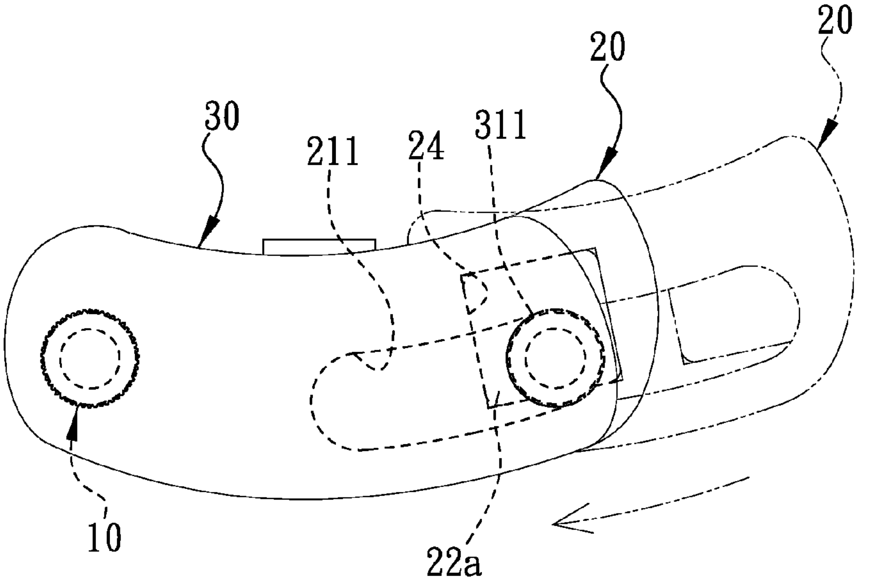
FIG. 2*b* is a schematic view illustrating the protrusion shown in FIG. 2*a* being magnetically attracted by the magnetic unit for being recovered and positioned according to the first embodiment of the present invention.

According to a first embodiment of the present invention, when the pivot unit 10 (or the base 20) is subject to an external force, e.g. a pulling force, greater than the magnetic force of the magnetic unit 22*a*, the pivot unit 10 (or the base 20) generates a movement relative to the base 20 (or the pivot unit 10), as shown in FIG. 2*a*, the connection units 30 are driven to act through the pivot unit 10, so each of the protrusions 311 slides in the corresponding groove 211 towards a direction corresponding to the direction in which the base 20 being pulled; when the external force is discharged or smaller than the magnetic force of the magnetic unit 22*a*, each of the protrusions 311 sliding in each of the corresponding grooves 211 is affected by the magnetic force provided by each of the magnetic units 22*a*, thereby being enabled to be recovered and positioned through the magnetic attraction provided by each of the magnetic units 22*a* (as shown in FIG. 2*a*), the positioned location of each of the protrusions 311 is determined by the actual installed location of each of the magnetic units 22*a*, i.e. not being limited to one side of each of the grooves 211, the magnetic units 22*a* can also be arranged at two adjacent sides; moreover, in actual practice, in order to achieve an effect of synchronous recovering and positioning, the magnetic units 22*a* are symmetrically arranged at two distal ends of the base 20, and the protrusions 311 are also symmetrically arranged.

Referring to FIG. 2, the base 20 is respectively concavely formed with a first positioning slot 24 at an inner side of the pair of grooves 211, the magnetic unit 22*a* is a magnet and installed and positioned in each of the first positioning slots 24, thereby increasing the sliding distance of the protrusion 311 in the groove 211.

Figure 3:
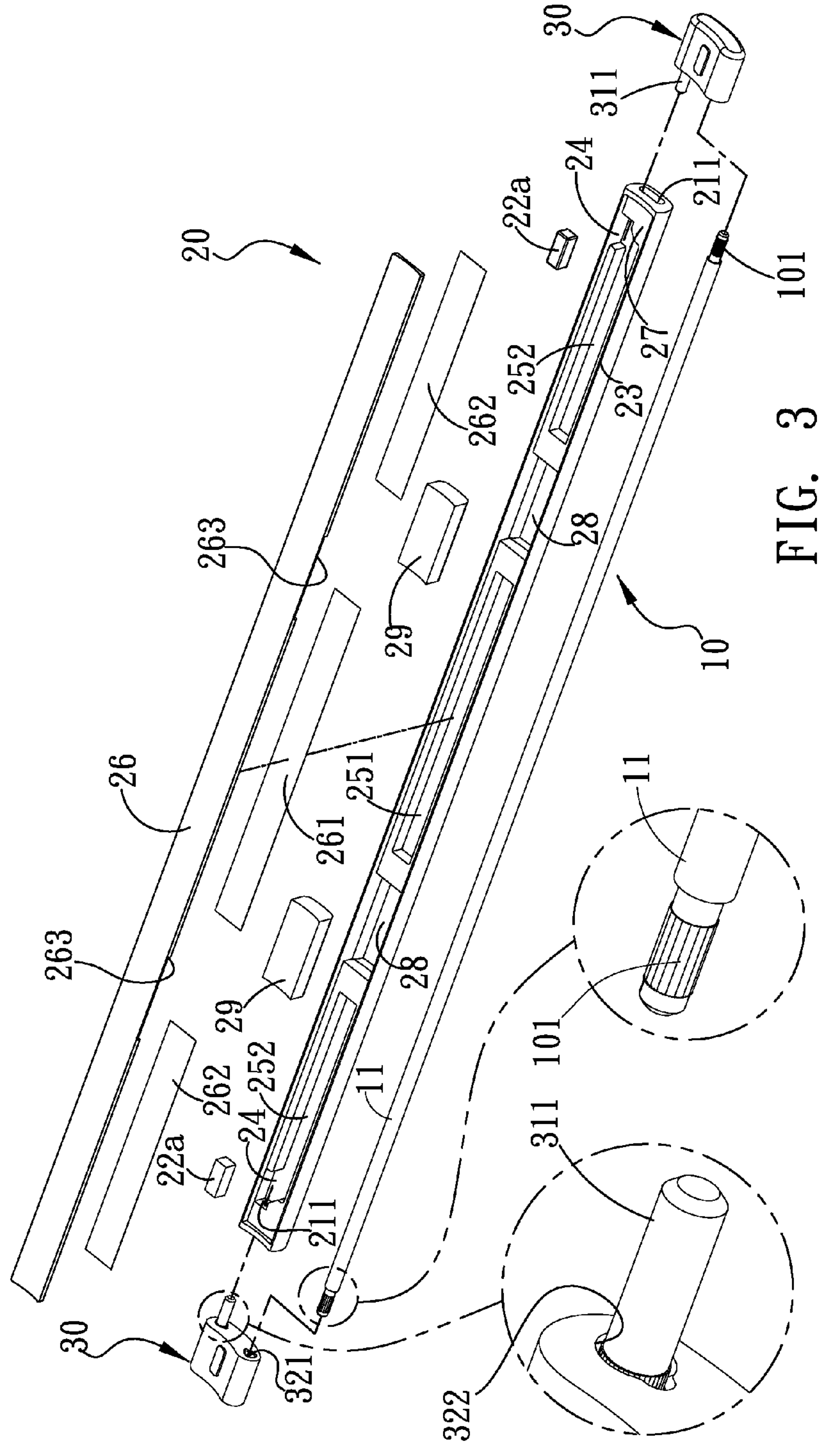
FIG. 3 is a schematic view illustrating the pivotal shaft device shown in FIG. 1 being further formed and installed with recessed slots, magnetic attraction units and a connecting sheet on the base according to the first embodiment of the present invention.
Figure 4:
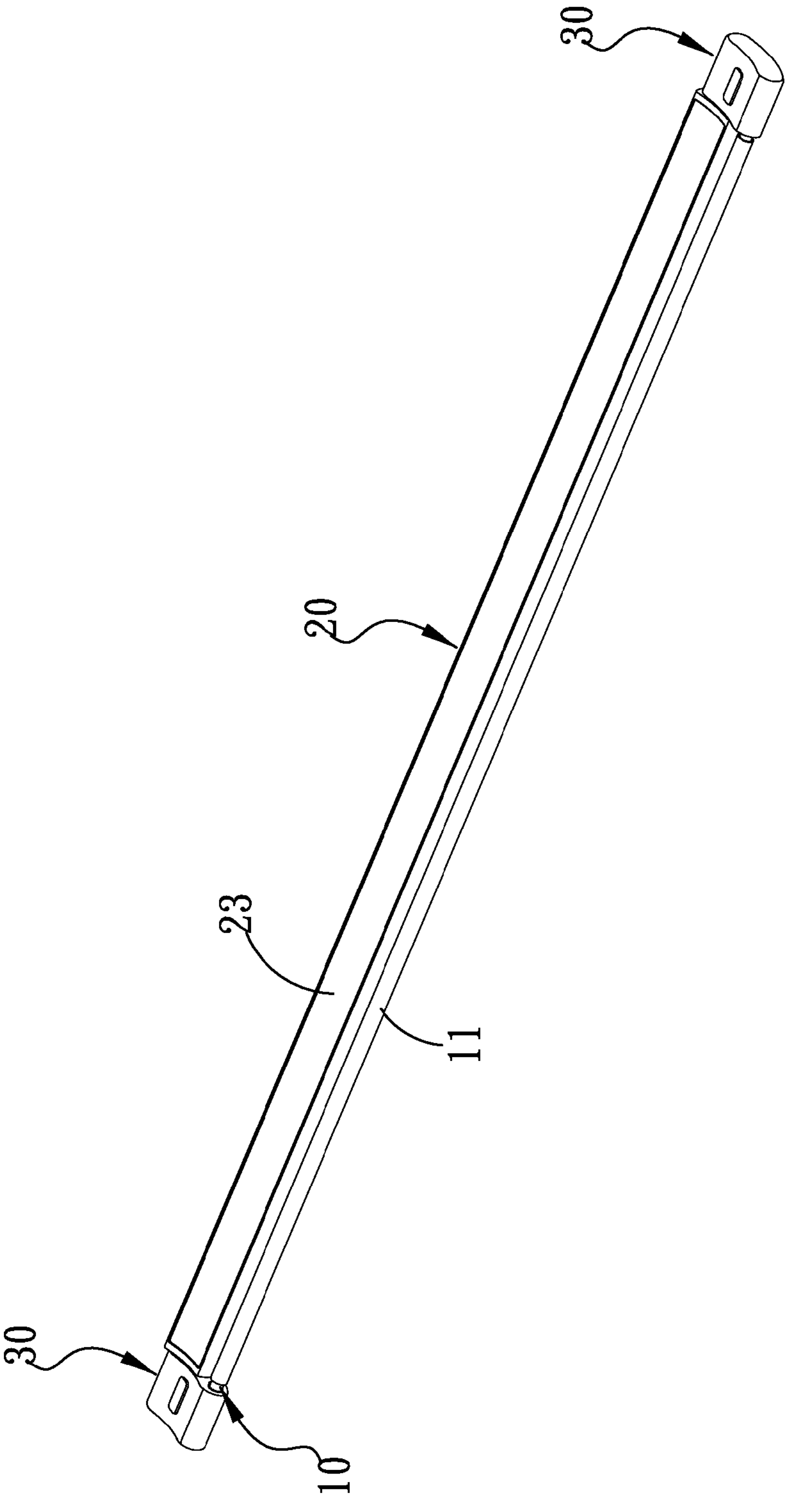
FIG. 4 is a perspective view illustrating the assembly of the pivotal shaft device shown in FIG. 3 according to the first embodiment of the present invention.

The pivotal shaft device forms a direct attaching contact, e.g. adhesion or magnetic attraction, with an object, e.g. a tablet computer (not shown in figures), through the attachment area 23 of the base 20, because the base 20 is enabled to be integrally formed, and for forming an indirect attaching contact, as shown in FIG. 3, the base 20 is further formed with plural recessed slots 251, 252 arranged with intervals in the attachment area 23, the first positioning slot 24 is in communication with the adjacent recessed slot 252, thereby reducing the material used for manufacturing the base 20, and a magnetic shunt and insertion plugs used in a conventional pivotal shaft device are saved, and the attachment area 23 is further formed with a connecting sheet 26 covering the recessed slots 251, 252, thereby allowing the base 20 and the connecting sheet 26 to be separately produced and facilitating the magnetic units 22*a* to be assembled in the first positioning slots 24 of the base 20 then being covered by the connecting sheet 26 for forming the indirect attaching contact.

Referring to FIG. 3, the base 20 is formed in a recessed arc state on the surface of the attachment area 23, and the attachment area 23 is further formed with a positioning shallow groove 27 for accommodating the connecting sheet 26, the recessed slots 251, 252 are located in the positioning shallow groove 27, and each of the first positioning slots 24 is in communication with the positioning shallow groove 27, thereby allowing each of the first positioning slots 24 and the recessed slots 251, 252 to be all exposed in the positioning shallow groove 27, one inner surface of the connecting sheet 26 is provided with plural adhering sheets 261, 262 arranged with intervals, each of the adhering sheets 261, 262 is correspondingly disposed in each of the recessed slots 251, 252, thereby enabling the periphery of each of the adhering sheets 261, 262 to be adhered on the periphery of each of the recessed slots 251, 252.

The base 20 is respectively formed with a second positioning slot 28 between the recessed slots 251, 252, thereby reducing the material used for manufacturing the base 20. Each of the second positioning slots 28 is installed with a magnetic attraction unit 29, what shall be addressed is that the magnetic attraction unit 29 can be optionally installed according to actual needs, and the structure is well known by skilled people in the art, so no further illustration is provided. The connecting sheet 26 is further formed with plural shallow grooves 263 staggeringly arranged with each of the adhering sheets 261, 262, the shallow grooves 263 are respectively corresponding to the magnetic attraction units 29, thereby preventing the magnetic attracting effect provided by the magnetic attraction unit 29 from being shielded or reduced.

Each of the connection units 30 is further formed with a recessed hole 321, and the pivot unit 10 is formed as a rod member, and a pipe member 11 is sleeved between the two distal ends of the pivot unit 10, wherein the two distal ends of the pivot unit 10 are respectively and annularly formed with a dentate structure 101, thereby allowing the two distal ends of the pivot unit 10 to be respectively received in the recessed holes 321 of the connection units 30, and the pivot unit 10 is prevented from loosening due to the rotating movement of the pipe member 11, i.e. the pivot unit is prevented from being rotated caused by being interfered by the pipe member.

The protrusion 311 of the connection unit 30 is a detachable shaft bolt, thereby allowing a second recessed hole 322 to be formed on each of the connection units 30, the portion of each of the shaft bolts received in the second recessed holes 322 is annularly formed with a dentate structure (as shown in a partially enlarged view in the bottom left side of FIG. 3), thereby preventing each of the shaft bolts from loosening due to the sliding or rotating movement of the base 20, i.e. each of the shaft bolts is prevented from being rotated caused by being interfered by the base, and each of the connection units 30 and each of the shaft bolts can be conveniently manufactured and assembled, or can be formed as a joint component for increasing the applicable range.

As shown in FIG. 5, which disclosed a second embodiment of the pivotal shaft device, wherein the second embodiment is an alternative of the first embodiment, and characterized in that: two distal ends of the base 20 are respectively formed with a protrusion 212, and an attachment area 23 is formed on a surface defined between the two protrusions 212; the two connection units 30 are respectively formed with a groove 312, a magnetic unit 33*a* is installed in each of the grooves 312, and each of the protrusions 212 of the base 20 is slidingly disposed in the groove 312 of each of the connection units 30 and magnetically attracted and positioned by the magnetic unit 33*a*.

According to the second embodiment, each of the connection units 30 is further concavely formed with a first positioning slot 34 in the groove 312, and the magnetic unit 33*a* is a magnet and disposed and positioned in the first positioning slot 34; same as what has been mentioned above, each of the protrusions 212 of the base 20 is a detachable shaft bolt, thereby allowing a second recessed hole to be respectively formed on the base 20 at the location where each of the protrusions 212 being formed, the portion of each of the shaft bolts received in the second recessed hole is annularly formed with a dentate structure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A pivotal shaft device, comprising:

a pivot unit being an elongated body;

a base being an elongated body and being positioned parallel with said pivot unit, the base has two grooves, a corresponding groove of said two grooves is located on each of two opposing ends of said base, a magnetic unit being installed at an inner side of each groove of said two grooves, an attachment area being formed on a surface of said base and located between said two grooves; and two connection units respectively connected with two opposing ends of said pivot unit, each connection unit of said two connection units being respectively formed with a protrusion, each said protrusion of said two connection units being slidingly inserted into said corresponding groove of said two grooves of said base and magnetically attracted and positioned by said magnetic unit; said pivotal shaft device is capable of a relative sliding movement generated between said base and said pivot unit, wherein said base sliding relative to said two connection units as each said protrusion slides in said corresponding groove of said two grooves and said base rotating relative to said two connection units during said relative sliding movement.

2. The pivotal shaft device as claimed in claim 1, wherein an inner side of each groove of said two grooves of said base is further concavely formed with a first positioning slot, and said magnetic unit is a magnet and respectively disposed and positioned in said first positioning slot.

3. The pivotal shaft device as claimed in claim 2, wherein said base is further formed with plural recessed slots arranged with intervals in said attachment area, each of said first positioning slots is in communication with said adjacent recessed slot, and said attachment area is further formed with a connecting sheet covering said recessed slots.

4. The pivotal shaft device as claimed in claim 3, wherein said base is formed in a recessed arc state on the surface of said attachment area, and said attachment area is further formed with a positioning shallow groove for accommodating said connecting sheet, said recessed slots are located in said positioning shallow groove, and each of said first positioning slots is in communication with said positioning shallow groove; one inner surface of said connecting sheet is provided with plural adhering sheets arranged with intervals, said adhering sheets are correspondingly disposed in said recessed slots.

5. The pivotal shaft device as claimed in claim 4, wherein said base is respectively formed with a second positioning slot between said recessed slots, said second positioning slot is installed with a magnetic attraction unit; said connecting sheet is further formed with plural shallow grooves staggeringly arranged with said adhering sheets, said shallow grooves are respectively corresponding to each of said magnetic attraction units.

6. The pivotal shaft device as claimed in claim 1, wherein said connection unit is further formed with a recessed hole, and said pivot unit is formed as a rod member, and a pipe member is sleeved between two distal opposing ends of said pivot unit, and said two opposing ends of said pivot unit are respectively and annularly formed with a dentate structure, said two opposing ends of said pivot unit are respectively inserted and fastened in said recessed hole of said connection unit.

7. The pivotal shaft device as claimed in claim 1, wherein said protrusion of said connection unit is a detachable shaft bolt, said connection unit has a second recess hole, a first end of said shaft bolt is inserted into said second recessed hole, said first end of said shaft bolt is annularly formed with a dentate structure.

8. A pivotal shaft device, comprising:

a pivot unit being an elongated body;

a base being an elongated body and being positioned parallel with said pivot unit, the base has two protrusions, one protrusion of the two protrusions is located on each end of two opposing ends of said base, an attachment area being formed on a surface of said base and located between said two protrusions; and two connection units respectively connected with two opposing ends of said pivot unit, each of said connection units being respectively formed with a groove, an inner side of each of said groove being installed with a magnetic unit, each of said protrusions of said base being slidingly disposed in said groove of a corresponding connection unit of said two connection units and magnetically attracted and positioned by said magnetic unit; said pivotal shaft device is capable of a relative sliding movement generated between said base and said pivot unit, wherein said base sliding relative to said two connection units as each said protrusion slides in said corresponding groove of said two grooves and said base rotating relative to said two connection units during said relative sliding movement.

9. The pivotal shaft device as claimed in claim 8, wherein an inner side of said groove of each of said connection units is further concavely formed with a first positioning slot, and said magnetic unit is a magnet and respectively disposed and positioned in said first positioning slot.

10. The pivotal shaft device as claimed in claim 8, wherein said connection unit is further formed with a recessed hole, and said pivot unit is formed as a rod member, and a pipe member is sleeved between two opposing ends of said pivot unit, and said two opposing ends of said pivot unit are respectively and annularly formed with a dentate structure, said two opposing ends of said pivot unit are respectively inserted and fastened in said recessed hole of said connection unit.

11. The pivotal shaft device as claimed in claim 8, wherein said protrusion of said base is a detachable shaft bolt, thereby allowing a second recessed hole to be formed on said base at the location where said protrusion being formed, a first end of said shaft bolt is inserted into said second recessed hole, said first end of said shaft bolt is annularly formed with a dentate structure.

* * * * *